US008559567B1

(12) United States Patent
Pick et al.

(10) Patent No.: US 8,559,567 B1
(45) Date of Patent: Oct. 15, 2013

(54) CHANNEL ESTIMATION USING REDUCED-COMPLEXITY CASCADED ONE-DIMENSIONAL FILTERING (75) Inventors: Kobby Pick, Beit Zait (IL); Yona Perets, Ra'anana (IL)

(73) Assignee: Marvell International Ltd., Hamilton (BM)

( * ) Notice: Subject to any disclaimer, the term of this patent is extended or adjusted under 35 U.S.C. 154(b) by 283 days.

(21) Appl. No.: 13/020,018

(22) Filed: Feb. 3, 2011

Related U.S. Application Data (60) Provisional application No. 61/301,779, filed on Feb. 5, 2010.

(51) Int. Cl.
H04L 27/06 (2006.01)

(52) U.S. Cl.
USPC ........... 375/340; 375/260; 375/259; 375/261; 375/295; 375/316

(58) Field of Classification Search
USPC ........ 370/200–546; 375/130–377; 455/1–899
See application file for complete search history.

(56) References Cited

U.S. PATENT DOCUMENTS

| | | | | |
|---|---|---|---|---|
| 6,990,061 | B2* | 1/2006 | Deneire et al. | 370/210 |
| 7,257,166 | B2* | 8/2007 | Kim | 375/260 |
| 7,492,828 | B2* | 2/2009 | Keerthi | 375/260 |
| 7,499,508 | B2* | 3/2009 | Sayeed | 375/345 |
| 8,019,036 | B2* | 9/2011 | Voltz et al. | 375/373 |
| 8,331,467 | B2* | 12/2012 | Osseiran et al. | 375/260 |
| 8,340,603 | B2* | 12/2012 | Brown et al. | 455/114.3 |
| 2002/0186799 | A1* | 12/2002 | Sayeed | 375/345 |
| 2004/0114691 | A1* | 6/2004 | Kim | 375/260 |
| 2006/0269016 | A1* | 11/2006 | Long et al. | 375/340 |
| 2007/0133391 | A1* | 6/2007 | Roh et al. | 370/208 |
| 2007/0206687 | A1* | 9/2007 | Ananth et al. | 375/260 |
| 2008/0240265 | A1* | 10/2008 | Fechtel | 375/260 |
| 2008/0253279 | A1* | 10/2008 | Ma et al. | 370/206 |
| 2009/0268695 | A1* | 10/2009 | Zhao et al. | 370/336 |
| 2009/0296836 | A1* | 12/2009 | Su | 375/260 |
| 2010/0009649 | A1* | 1/2010 | Huebner et al. | 455/334 |
| 2010/0027717 | A1* | 2/2010 | Lin et al. | 375/340 |
| 2010/0074346 | A1* | 3/2010 | Thompson et al. | 375/260 |
| 2011/0286499 | A1* | 11/2011 | Panicker et al. | 375/148 |
| 2012/0020439 | A1* | 1/2012 | Belveze et al. | 375/343 |

OTHER PUBLICATIONS

3GPP TS 36.211, "3rd Generation Partnership Project; Technical Specification Group Radio Access Network; Evolved Universal Terrestrial Radio Access (EUTRA); Physical Channels and Modulation (Release 8)", Version 8.8.0, section 6.10, Sophia Antipolis, France, Sep. 2009.

* cited by examiner

*Primary Examiner* — Daniel Washburn
*Assistant Examiner* — Amneet Singh (57) ABSTRACT

A method includes receiving signals that are transmitted over a communication channel in multiple blocks that are transmitted in respective frequency bins during respective time intervals, some of the blocks in a predefined subset of the frequency bins containing reference signals. An estimate of the communication channel, for a given block transmitted during a respective time interval, is computed by (i) computing respective interim filtering results for the blocks transmitted in the respective time interval in the respective frequency bins belonging to the predefined subset, by filtering one or more of the reference signals transmitted in the respective frequency bins of the block; and (ii) combining the interim filtering results to produce the estimate of the communication channel.

17 Claims, 4 Drawing Sheets

CHANNEL ESTIMATION USING REDUCED-COMPLEXITY CASCADED ONE-DIMENSIONAL FILTERING

CROSS-REFERENCE TO RELATED APPLICATIONS

This application claims the benefit of U.S. Provisional Patent Application 61/301,779, filed Feb. 5, 2010, whose disclosure is incorporated herein by reference.

FIELD OF THE DISCLOSURE

The present disclosure relates generally to communication systems, and particularly to methods and systems for communication channel estimation.

BACKGROUND

In many communication applications, a transmitter transmits signals to a receiver over a communication channel, and the receiver estimates the response of the communication channel. Channel estimation can be used for various purposes, such as for channel equalization or other reception tasks, or for sending feedback to the transmitter so as to adapt subsequent transmissions to the channel conditions. In some communication systems, the receiver estimates the channel by processing reference signals or pilot signals that are transmitted from the transmitter.

Channel estimation based on reference signals is used, for example, in Evolved Universal Terrestrial Radio Access (E-UTRA) systems, also referred to as Long Term Evolution (LTE) systems. Reference signals and channel estimation in LTE systems are specified by the Third Generation Partnership Project (3GPP), in "Technical Specification Group Radio Access Network; Evolved Universal Terrestrial Radio Access (E-UTRA); Physical Channels and Modulation (Release 8)," TS 36.211, version 8.8.0, September, 2009, section 6.10, which is incorporated herein by reference.

The description above is presented as a general overview of related art in this field and should not be construed as an admission that any of the information it contains constitutes prior art against the present patent application.

SUMMARY

An embodiment that is described herein provides a method including receiving signals that are transmitted over a communication channel in multiple blocks that are transmitted in respective frequency bins during respective time intervals. Some of the blocks in a predefined subset of the frequency bins contain reference signals. An estimate of the communication channel, for a given block transmitted during a respective time interval, is computed by (i) computing respective interim filtering results for the blocks transmitted in the respective time interval in the respective frequency bins belonging to the predefined subset, by filtering one or more of the reference signals transmitted in the respective frequency bins of the block; and (ii) combining the interim filtering results to produce the estimate of the communication channel.

In some embodiments, computing the interim filtering results includes initially filtering the reference signals in a time domain, and combining the interim filtering results includes subsequently filtering the interim filtering results in a frequency domain. In an embodiment, filtering the reference signals in the time domain includes defining a time-domain filter having first and second parts, filtering a first subset of the reference signals using the first part, and filtering a second subset of the reference signals using the second part. In another embodiment, filtering the interim filtering results in the frequency domain includes defining a frequency-domain filter having first and second parts, filtering a first subset of the interim filtering results using the first part, and filtering a second subset of the interim filtering results using the second part.

In a disclosed embodiment, receiving the signals includes receiving a sequence of Orthogonal Frequency Division Multiplexing (OFDM) symbols, each frequency bin corresponding to a respective group of one or more OFDM subcarriers. In an embodiment, receiving the signals includes correcting the received signals using an adaptive receiver loop, and computing each interim filtering result includes reversing correction of the reference signals transmitted in the respective frequency bins, and computing the interim filtering result using the reverse-corrected reference signals. In an embodiment, reversing the corrections includes reversing gain or timing corrections that are applied to the received signals.

There is additionally provided, in accordance with an embodiment that is described herein, apparatus including a receiver and a channel estimation unit. The receiver is configured to receive signals that are transmitted over a communication channel in multiple blocks that are transmitted in respective frequency bins during respective time intervals, some of the blocks in a predefined subset of the frequency bins containing reference signals. The channel estimation unit is configured to compute an estimate of the communication channel for a given block transmitted during a respective time interval by: (1) computing respective interim filtering results for the blocks transmitted in the respective time interval in the respective frequency bins belonging to the predefined subset, by filtering one or more of the reference signals transmitted in the respective frequency bins of the block; and (ii) combining the interim filtering results to produce the estimate of the communication channel.

In some embodiments, a mobile communication terminal includes the disclosed apparatus. In some embodiments, a communication base station includes the disclosed apparatus. In some embodiments, a chipset for processing signals in a mobile communication terminal includes the disclosed apparatus.

There is also provided, in accordance with an embodiment that is described herein, a method including receiving signals that are transmitted over a communication channel in multiple time-frequency blocks, some of the blocks containing reference signals. An estimate of the communication channel is computed by applying to the reference signals a cascaded filtering scheme that initially carries out time-domain filtering and subsequently carries out frequency-domain filtering. In some embodiments, computing the estimate of the communication channel includes producing, using the time-domain filtering, fewer interim filtering results relative to an alternative cascaded filtering scheme that initially carries out the frequency-domain filtering and subsequently carries out the time-domain filtering.

The present disclosure will be more fully understood from the following detailed description of the embodiments thereof, taken together with the drawings in which:

DETAILED DESCRIPTION OF EMBODIMENTS

Embodiments that are described herein provide improved methods and systems for estimating the response of a communication channel between a transmitter and a receiver. Although these embodiments refer to Orthogonal Frequency Division Multiplexing (OFDM), the disclosed techniques are also applicable in various other communication systems that transmit data in two-dimensional blocks.

Typically, the transmitter transmits reference signals in some of the blocks, e.g., according to a predefined pattern in the time-frequency plane. The other blocks in the time-frequency plane carry data. The receiver estimates the channel response for a certain data block by filtering received reference signals that are located in time-frequency proximity to this data block. Thus, estimating the channel involves filtering over time as well as over frequency.

It is possible in principle to estimate the channel by applying a full-blown two-dimensional filter to the received reference signals. This solution, however, is computationally intensive and is typically beyond the capabilities of a practical receiver such as a receiver of a cellular handset. In the disclosed techniques, the receiver initially applies time-domain filtering so as to produce interim filtering results, and subsequently applies frequency-domain filtering to the interim filtering results. This two-phase process estimates the channel with high accuracy, and involves considerably fewer computations than full two-dimensional filtering. The disclosed filtering process is mathematically equivalent to filtering in the reverse order (over frequency first and then over time) but requires storage of a smaller volume of interim results. Therefore, the methods and systems described herein enable considerable reduction in memory size.

In some embodiments, the reference signals are transmitted only in a partial subset of the frequency bins and only in some of the blocks belonging to these bins. For a given data block that lies in a given time interval, the time-domain filtering process produces respective interim filtering results for the blocks that (i) lie in the same time interval as the data block and (ii) belong to the subset of frequency bins containing reference signals. The subsequent frequency-domain filtering process combines the interim filtering results to produce an estimate of the channel response for the data block in question. An example filtering scheme that carries out this two-phase process is described below.

By performing time-domain filtering before frequency-domain filtering, the receiver is required to store only a relatively small number of interim filtering results, instead of storing multiple frequency-domain filtering results for each time interval. The disclosed techniques enable the receiver to perform channel estimation using a relatively small memory size, thereby reducing the receiver cost, size and power consumption. Moreover, when the filtering results need to be corrected (e.g., to compensate for gain or timing adjustments performed by the receiver), the disclosed techniques enable the receiver to correct only a small number of interim results, thereby reducing computational complexity and hardware size.

Figures 1, 2:
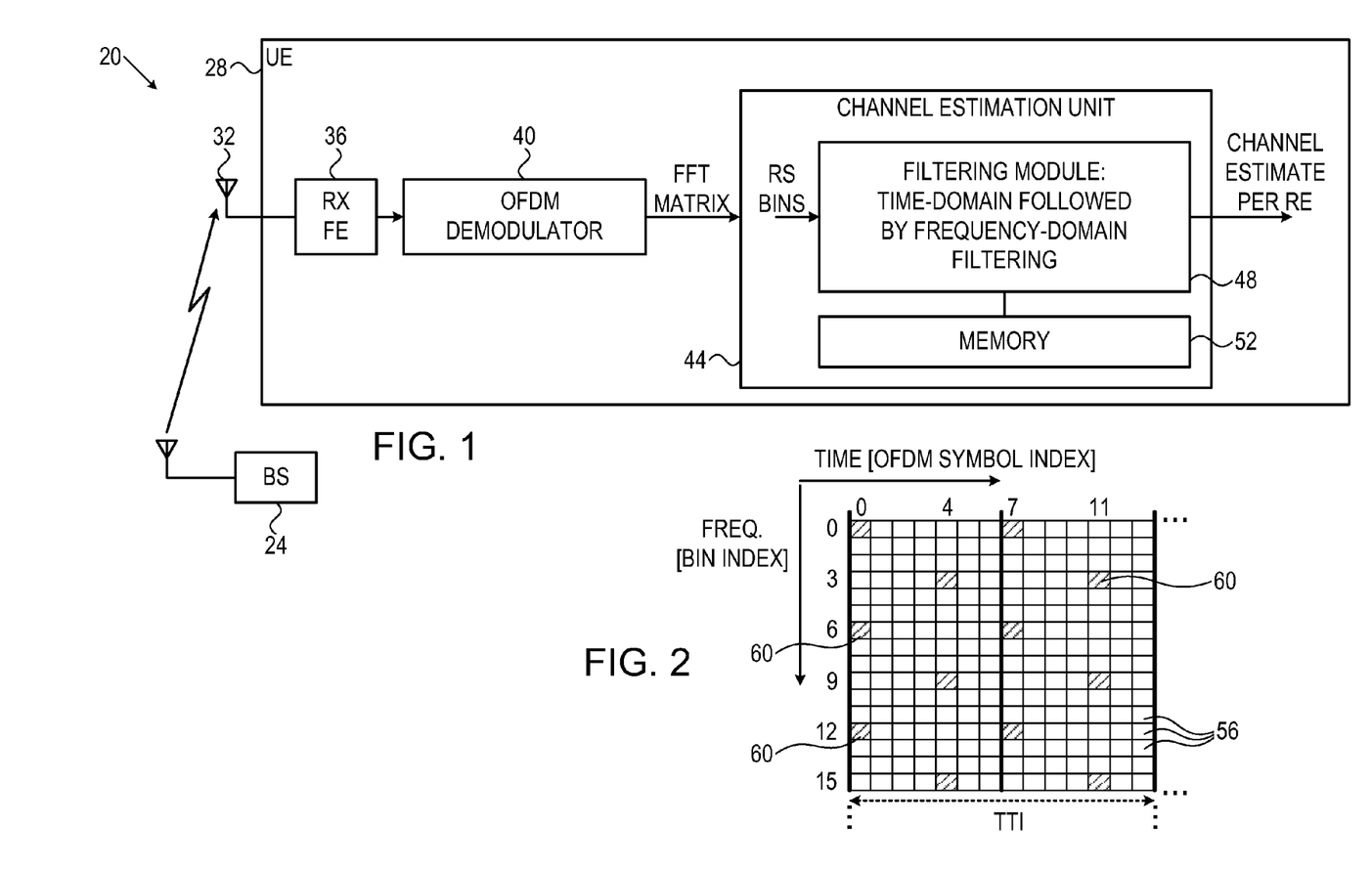
FIG. 1 is a block diagram that schematically illustrates an Orthogonal Frequency Division Multiplexing (OFDM) communication system, in accordance with an embodiment that is described herein.
FIG. 2 is a diagram that schematically illustrates a Fast Fourier Transform (FFT) matrix produced by an OFDM receiver, in accordance with an embodiment that is described herein.

FIG. 1 is a block diagram that schematically illustrates an Orthogonal Frequency Division Multiplexing (OFDM) communication system 20, in accordance with an embodiment that is described herein. System 20 in this embodiment comprises a Base Station (BS) 24 that transmits to a mobile communication terminal (also referred to as User Equipment—UE) 28 using OFDM modulation. In the present example, system 20 operates in accordance with the E-UTRA (LTE) specifications, cited above. In alternative embodiments, however, system 20 may operate in accordance with any other suitable communication protocol or air interface that transmits data in multiple frequency bins over multiple time intervals, such as WiFi systems operating in accordance with IEEE 802.11 specifications. Although FIG. 1 shows only a single BS and a single UE for the sake of clarity, real-life systems typically comprise multiple BSs and multiple UEs.

BS 24 transmits downlink OFDM signals to UE 28. The OFDM signal comprises a sequence of OFDM symbols, and each OFDM symbol is transmitted over multiple modulated subcarriers in respective frequency bins. In other words, the OFDM signal comprises multiple blocks (Resource Elements—REs—in LTE terminology) that are transmitted in respective frequency bins over respective time intervals. Some of the REs carry data, while other REs carry Reference Signals (RS). An example of such a signal is illustrated in FIG. 2 below.

UE 28 comprises one or more antennas 32 for receiving the downlink signals from BS 24. A Receiver Front-End (RX FE) 36 receives, amplifies and down-converts the received signal to baseband. The baseband signal is then digitized using one or more Analog to Digital Converters (ADCs—not shown in the figure). An OFDM demodulator 40 demodulates the OFDM signal. Among other tasks, demodulator 40 typically applies Fast Fourier Transform (FFT) to the signal, so as to produce an FFT matrix. The rows and columns of the FFT matrix correspond to the frequency bins and OFDM symbols of the signal, respectively. Each element of the FFT matrix comprises the (complex) value of the signal on a respective frequency bin within a respective OFDM symbol.

UE 28 comprises a channel estimation unit 44, which estimates the response of the communication channel between BS 24 and UE 28 based on the FFT matrix that is provided by OFDM demodulator 40. Unit 44 accepts the FFT matrix (or parts thereof) as input, and produces estimates of the channel response for at least some of the REs. In the context of the present patent application and in the claims, the terms "estimating the channel" and "estimating the channel response" refer to estimation of the transfer gain and/or phase of the communication channel between the BS and the UE. In some embodiments (addressed below) the BS and/or UE comprise multiple antennas, in which case channel estimation typically involves estimating multiple transfer gain and/or phase values.

In an embodiment, channel estimation unit comprises a filtering module 48 and a memory 52. Filtering module 48 computes the channel estimates using a highly-efficient filtering process that is described in detail further below. Module 48 uses memory 52 for storing any suitable information that is related to channel estimation, such as input FFT matrix values, output channel estimates and/or interim filtering results. As will be explained below, the disclosed channel estimation methods are highly efficient in consuming memory resources, and therefore enable using small memory space.

The configurations of system 20 and UE 28 shown in FIG. 1 are example configurations, which are chosen solely for the sake of conceptual clarity. In alternative embodiments, any other suitable system and/or UE configuration can be used. System and UE elements that are not mandatory for understanding of the disclosed techniques have been omitted from the figure for the sake of clarity. For example, FIG. 1 refers mainly to channel estimation based on downlink transmission from BS 24 to UE 28, even though the BS and UE typically conduct bidirectional communication. Thus, UE elements that are related to uplink transmission are not shown in the figure.

The embodiments that are described herein refer to a single communication channel between BS 24 and UE 28, for the sake of clarity. In some embodiments, however, system 20 comprises a Multiple-Input Multiple-Output (MIMO) system in which the BS and/or UE comprises multiple antennas, and communication between the BS and the UE is conducted simultaneously over multiple communication channels. In these embodiments, the UE estimates each of the multiple communication channels using the disclosed techniques.

Although the embodiments described herein mainly address channel estimation in the UE based on reception of downlink signals, the disclosed techniques can be applied in a similar manner in the uplink, as well. In such embodiments, a BS uplink receiver estimates the communication channel based on reception of uplink signals.

The different BS and UE elements are typically implemented using dedicated hardware, such as using one or more Application-Specific Integrated Circuits (ASICs), Radio frequency Integrated Circuits (RFIC) and/or Field-Programmable Gate Arrays (FPGAs). Alternatively, some elements may be implemented using software executing on programmable hardware, or using a combination of hardware and software elements. In some embodiments, some or all of the elements of UE 28 may be fabricated in a chip-set. When implementing some or all of the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

FIG. 2 is a diagram that schematically illustrates the FFT matrix that is produced by OFDM demodulator 40, in accordance with an embodiment that is described herein. Each matrix element 56 corresponds to a respective RE of the received OFDM signal. The terms "matrix element" and "RE" are therefore used interchangeably herein. In the time domain, this example FFT matrix spans one or more Transmission Time Intervals (TTIs), each TTI spanning fourteen OFDM symbols. In the frequency domain, the FFT matrix spans multiple frequency bins.

Some of the REs comprise Reference Signals (RS), and are therefore referred to as RS REs 60. The RS REs are marked with a diagonal pattern in FIG. 2. The other REs (which do not contain RS) carry modulated data, and are referred to as data REs. Typically, the RS REs are distributed over time and frequency in the OFDM signal (and thus in the FFT matrix) according to a predefined pattern that is known to both the BS and the UE. For example, RS RE patterns in LTE signals are specified in section 6.10 of the 3GPP TS 36.211 specification, cited above.

In the present example, the RS REs are located in pre-designated frequency bins of OFDM symbols 0, 4, 7, 11, . . . . Note that only a partial subset of the frequency bins potentially comprise RS REs in some of the OFDM symbols. In the present example, RS REs are potentially transmitted in every third frequency bin, i.e., in frequency bins 0, 3, 6, 9, 12, 15 . . . . Other frequency bins do not contain RS REs in any of the OFDM symbols. The FFT matrix and RS RE pattern of FIG. 2 are shown purely by way of example. In alternative embodiments, any other suitable FFT matrix and/or RS RE pattern can be used.

Typically, channel estimation unit 44 estimates the channel for a certain data RE by filtering the received RSs that are located in time-frequency proximity to the data RE. In other words, unit 44 filters the FFT matrix elements corresponding to the RS REs that are located in time-frequency proximity to the data RE, to produce an estimate of the channel response for the data RE. In the disclosed embodiments, unit 44 applies time-domain filtering first, followed by frequency-domain filtering.

Figure 3:
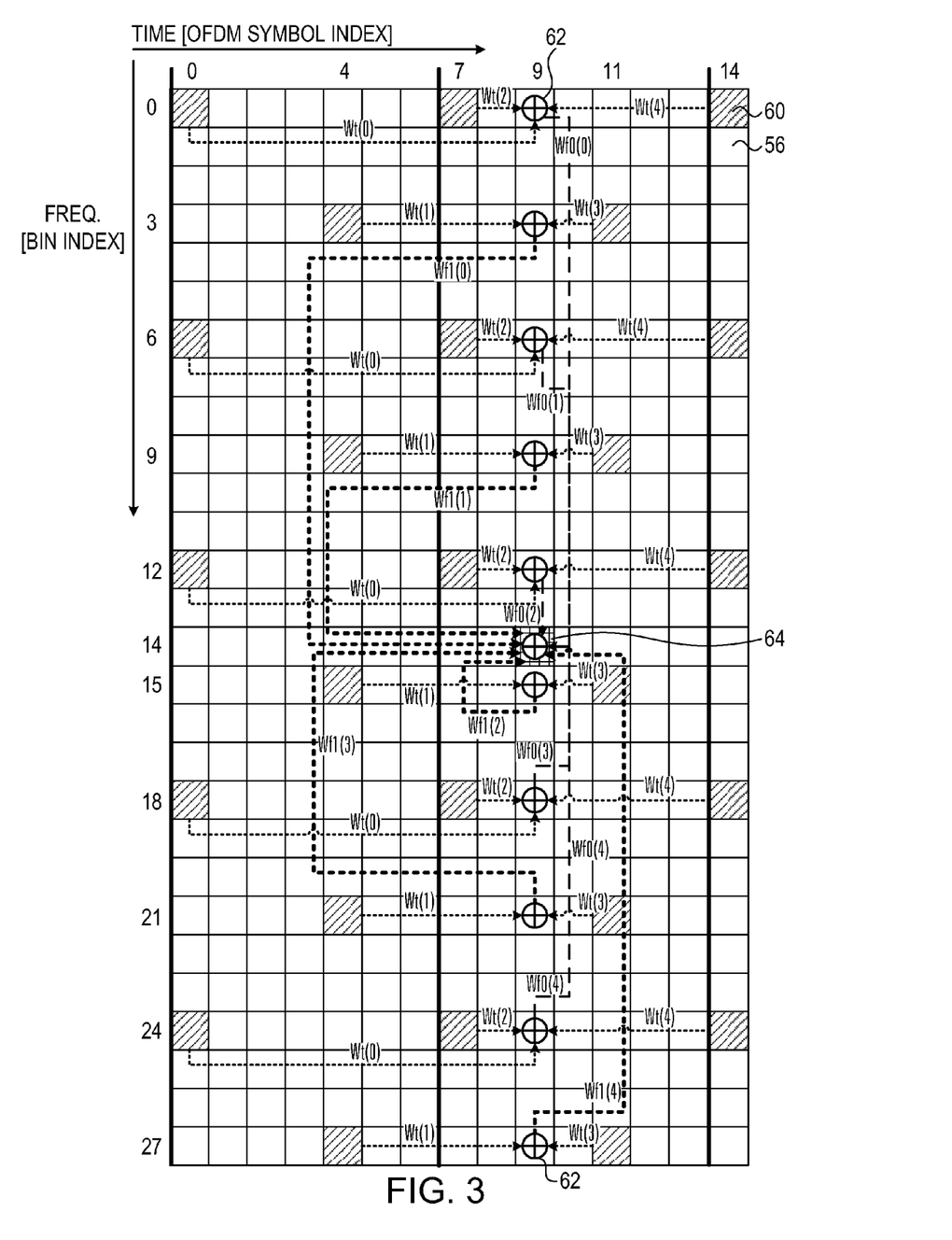
FIG. 3 is a diagram that schematically illustrates a method for channel estimation in an OFDM receiver, in accordance with an embodiment that is described herein.

FIG. 3 is a diagram that schematically illustrates a method for channel estimation carried out by channel estimation unit 44, in accordance with an embodiment that is described herein. The figure shows the FFT matrix for fifteen OFDM symbols (having indices 0 . . . 14) and twenty-eight frequency bins (having indices 0 . . . 27). As in FIG. 2 above, RS REs 60 are marked with a diagonal pattern. In the present embodiment, unit 44 computes each channel estimate based on the intersection of (i) the ten nearest frequency bins that contain reference signals, and (ii) the five nearest OFDM symbols that contain reference signals.

In the example of FIG. 3, unit 44 estimates the channel for a data RE 64 that is located in the $14^{th}$ frequency bin of the $9^{th}$ OFDM symbol. (Data RE 64 is marked with a hatched pattern in the figure). The first filtering phase is performed in the time domain. In this phase, unit 44 calculates a set of ten interim filtering results for ten respective REs 62 that are located in the same OFDM symbol as data RE 64 and in the frequency bins containing reference signals. In the present example, reference signals are transmitted in ten frequency bins 0, 3, 6, 9, 12, 15, 18, 21, 24 and 27. For each of these frequency bins, unit 44 computes a respective interim filtering result for the RE 62 that is located in the $9^{th}$ OFDM symbol. REs 62, for which the interim filtering results are computed, are marked with ⊕ symbols in the figure.

In the present example, unit 44 performs the time-domain filtering using a time-domain filter having five coefficients (taps) denoted $w_t(0) \ldots w_t(4)$. Each received reference signal is multiplied by the respective coefficient, and the multiplication results are summed to produce the interim filtering result. The time-domain filter in this example is partitioned into two parts. One part of the filter (including coefficients $w_t(0), w_t(2), w_t(4)$) is applied to the reference signals in the even-order frequency bins that contain reference signals (bins 0, 6, 12, 18 and 24). The other part of the filter (including coefficients $w_t(1), w_t(3)$) is applied to the reference signals in the odd-order frequency bins that contain reference signals (bins 3, 9, 15, 21 and 27).

Having computed the interim filtering results using time-domain filtering, unit 44 combines them using frequency-domain filtering to produce the channel estimate for data RE 64. This process is referred to as the second filtering phase. In the present example, unit 44 performs the frequency-domain filtering using a frequency-domain filter having ten coefficients. The filter is partitioned into two parts. One part of the filter (including coefficients denoted $wf_0(0) \ldots wf_0(4)$) is applied to the interim filtering results of the even-order frequency bins that contain reference signals (bins 0, 6, 12, 18 and 24). The other part of the filter (including coefficients denoted $wf_1(0) \ldots wf_1(4)$) is applied to the interim filtering results of the odd-order frequency bins that contain reference signals (bins 3, 9, 15, 21 and 27).

Figure 4:
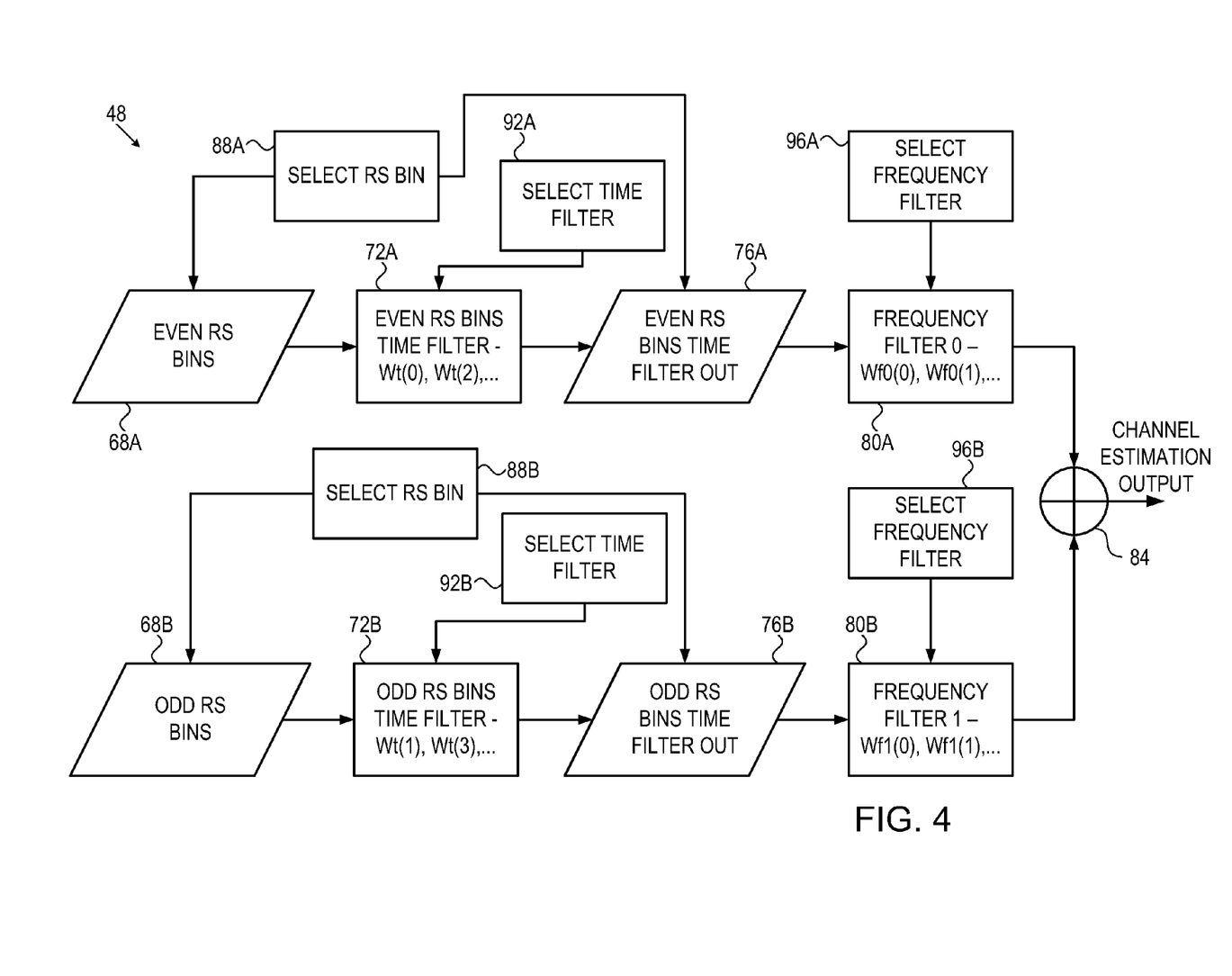
FIG. 4 is a block diagram that schematically illustrates a filtering module for channel estimation, in accordance with an embodiment that is described herein.

Each interim filtering result is multiplied by the respective coefficient of the frequency-domain filter, and the multiplication results are summed. The output of the frequency-domain filter is output by unit 44 as the channel estimate for data RE 64. Channel estimates for the other data REs are typically computed by unit 44 in a similar manner. An example filtering scheme that carries out the two-phase filtering process is shown in FIG. 4 below.

The following description formulates the above-described channel estimation process. The channel estimate for the $k^{th}$ frequency bin of the $n^{th}$ OFDM symbol is given by:

$$\hat{h}(n, k) = \sum_{m=0}^{N_T-1} w^t(m) \cdot \hat{h}_f(RS_t(n, m), k) \quad \text{Equation 1}$$

wherein $\hat{h}_f$ is given by:

$$\hat{h}_f(n, k) = \sum_{l=-\left(\frac{N_F-1}{2}\right)}^{l=\left(\frac{N_F-1}{2}\right)} w^f_{L(n)}(l) y(n, RS_f(n, k, l)) \quad \text{Equation 2}$$

$$\text{wherein } L(n) = \begin{cases} 0 & n \bmod 7 = 0 \\ 1 & n \bmod 7 = 4 \end{cases}$$

In the above equations, filtering in the time domain is carried out using a time-domain filter having $N_T$ coefficients and a frequency-domain filter having $N_F$ coefficients. (In the example of FIG. 3, $N_T=N_F=5$.) The $m^{th}$ coefficient of the time-domain filter is denoted $w^t(m)$. $RS_t(n,m)$ denotes the $m^{th}$ element within the group of indices of the OFDM symbols whose reference signals participate in the channel estimation of OFDM symbol n. In the example of FIG. 3, for the $9^{th}$ OFDM symbol, this group of indices is {0,4,7,11,14}.

$RS_f(n,k,l)$ denotes the $l^{th}$ element within the group of indices of the frequency bins that contain reference signals and whose reference signals participate in the channel estimation of the $k^{th}$ frequency bin of OFDM symbol n. For example, in FIG. 3, for n=7 and k=14, this group of indices is {0,6,12,18,24}. For n=11 and k=14, on the other hand, the group of indices is {3,9,15,21,27}.

In Equation 2 above, $W_0^f(l)$ denotes the $l^{th}$ coefficient of the first part of the frequency-domain filter, which filters the interim filtering results in the even-order frequency bins that contain reference signals. $w_1^f(l)$ denotes the $l^{th}$ coefficient of the second part of the frequency-domain filter, which filters the interim filtering results in the odd-order frequency bins that contain reference signals. The received signal at the $k^{th}$ frequency bin of the $n^{th}$ OFDM symbol is denoted $y(n,k)$.

From Equations 1 and 2 above it can be shown that:

$$\hat{h}_f(n, k) = \sum_{l=-\left(\frac{N_F-1}{2}\right)}^{l=\left(\frac{N_F-1}{2}\right)} w_0^f(l) \hat{h}_t^{even}(n, k, l) + \sum_{l=-\left(\frac{N_F-1}{2}\right)}^{l=\left(\frac{N_F-1}{2}\right)} w_1^f(l) \hat{h}_t^{odd}(n, k, l) \quad \text{Equation 3}$$

wherein $\hat{h}_t^{even}(n, k, l)$ and $\hat{h}_t^{odd}(n, k, l)$ are given by:

$$\hat{h}_t^{even}(n, k, l) = \sum_{m=0,2,4,\ldots} w^t(m) y(RS_t(n, m), RS_f(n, k, l)) \quad \text{Equation 4}$$

$$\hat{h}_t^{odd}(n, k, l) = \sum_{m=1,3,5,\ldots} w^t(m) y(RS_t(n, m), RS_f(n, k, l))$$

Thus, we have replaced frequency-domain filtering followed by time-domain filtering by equivalent time-domain filtering followed by frequency-domain filtering. A full proof of this equivalence can be found in U.S. Provisional Patent Application 61/301,779, cited above. Unlike frequency-domain filtering followed by time-domain filtering, however, the disclosed technique involves storage of only $2N_F$ intermediate filtering results.

In the example of FIG. 3, the estimated channel for data RE 64 (at the $14^{th}$ frequency bin of the $9^{th}$ OFDM symbol, i.e., n=9, k=14), when calculated according to Equation 1, is given by:

$$\hat{h}(9, 14) = w^t(0)\hat{h}_f(0, 14) + w^t(1)\hat{h}_f(4, 14) + \quad \text{Equation 5}$$
$$w^t(2)\hat{h}_f(7, 14) + w^t(3)\hat{h}_f(11, 14) + w^t(4)\hat{h}_f(14, 14)$$

$$\hat{h}_f(0, 14) = \sum_{l=-2}^{2} w_0^f(l) y(0, 12 + 6l)$$

$$\hat{h}_f(4, 14) = \sum_{l=-2}^{2} w_1^f(l) y(4, 15 + 6l)$$

$$\hat{h}_f(7, 14) = \sum_{l=-2}^{2} w_0^f(l) y(7, 12 + 6l)$$

$$\hat{h}_f(11, 14) = \sum_{l=-2}^{2} w_1^f(l) y(11, 15 + 6l)$$

$$\hat{h}_f(14, 14) = \sum_{l=-2}^{2} w_0^f(l) y(14, 12 + 6l)$$

The equivalent estimated channel at data RE 64, according to Equation 2, is given by:

$$\hat{h}(9, 14) = \sum_{l=-2}^{2} w_0^f(l) \hat{h}_t^{even}(9, 12, l) + \sum_{l=-2}^{2} w_1^f(l) \hat{h}_t^{odd}(9, 15, l) \quad \text{Equation 6}$$

$$\hat{h}_t^{even}(9, 12, -2) = w^t(0)y(0, 0) + w^t(2)y(7, 0) + w^t(4)y(14, 0)$$
$$\hat{h}_t^{even}(9, 12, -1) = w^t(0)y(0, 6) + w^t(2)y(7, 6) + w^t(4)y(14, 6)$$
$$\hat{h}_t^{even}(9, 12, 0) =$$
$$\quad w^t(0)y(0, 12) + w^t(2)y(7, 12) + w^t(4)y(14, 12)$$
$$\hat{h}_t^{even}(9, 12, 1) = w^t(0)y(0, 18) +$$
$$\quad w^t(2)y(7, 18) + w^t(4)y(14, 18)$$
$$\hat{h}_t^{even}(9, 12, 2) = w^t(0)y(0, 24) +$$
$$\quad w^t(2)y(7, 24) + w^t(4)y(14, 24)$$
$$\hat{h}_t^{odd}(9, 15, -2) = w^t(1)y(4, 3) + w^t(3)y(11, 3)$$
$$\hat{h}_t^{odd}(9, 15, -1) = w^t(1)y(4, 9) + w^t(3)y(11, 9)$$
$$\hat{h}_t^{odd}(9, 15, 0) = w^t(1)y(4, 15) + w^t(3)y(11, 15)$$
$$\hat{h}_t^{odd}(9, 15, 1) = w^t(1)y(4, 21) + w^t(3)y(11, 21)$$
$$\hat{h}_t^{odd}(9, 15, 2) = w^t(1)y(4, 27) + w^t(3)y(11, 27)$$

FIG. 4 is a block diagram that schematically illustrates filtering module 48, in accordance with an embodiment that is described herein. The filtering module configuration of FIG. 4 carries out the two-phase filtering process described above. Module comprises two parallel processing channels, which process the reference signals from even-order and odd-order frequency bins, respectively.

In the first processing channel, an even-order input buffer 68A accepts and buffers the reference signals from the even-order frequency bins that contain reference signals. An even-bin time-filtering block 72A filters these reference signals in time domain using the first part of the time-domain filter. The time-domain filter is selected by a time-filter selection block 92A. The output of block 72A (interim filtering results) is buffered in an even-bin output buffer 76A. A bin selection block 88A selects the bins to be buffered in buffers 68A and 76A. An even-bin frequency-filtering block 80A filters the interim filtering results that are buffered in buffer 76A using the first part of the frequency-domain filter. A frequency-filter selection block 96A selects this frequency-domain filter.

In the second processing channel, an odd-order input buffer 68B accepts and buffers the reference signals from the odd-order frequency bins that contain reference signals. An odd-bin time-filtering block 72B filters these reference signals in time domain using the second part of the time-domain filter. The time-domain filter is selected by a time-filter selection block 92B. The output of block 72B (interim filtering results) is buffered in an odd-bin output buffer 76B. A bin selection block 88B selects the bins to be buffered in buffers 68B and 76B. An odd-bin frequency-filtering block 80B filters the interim filtering results that are buffered in buffer 76B using the second part of the frequency-domain filter. A frequency-filter selection block 96B selects this frequency-domain filter.

A summer 84 sums the outputs of blocks 80A and 80B to produce the channel estimates for the data REs. The channel estimates are provided as output of module 48. The filtering unit configuration of FIG. 4 is an example configuration, which is depicted solely for the sake of conceptual clarity. In alternative embodiments, any other suitable filtering scheme can be used.

Figure 5:
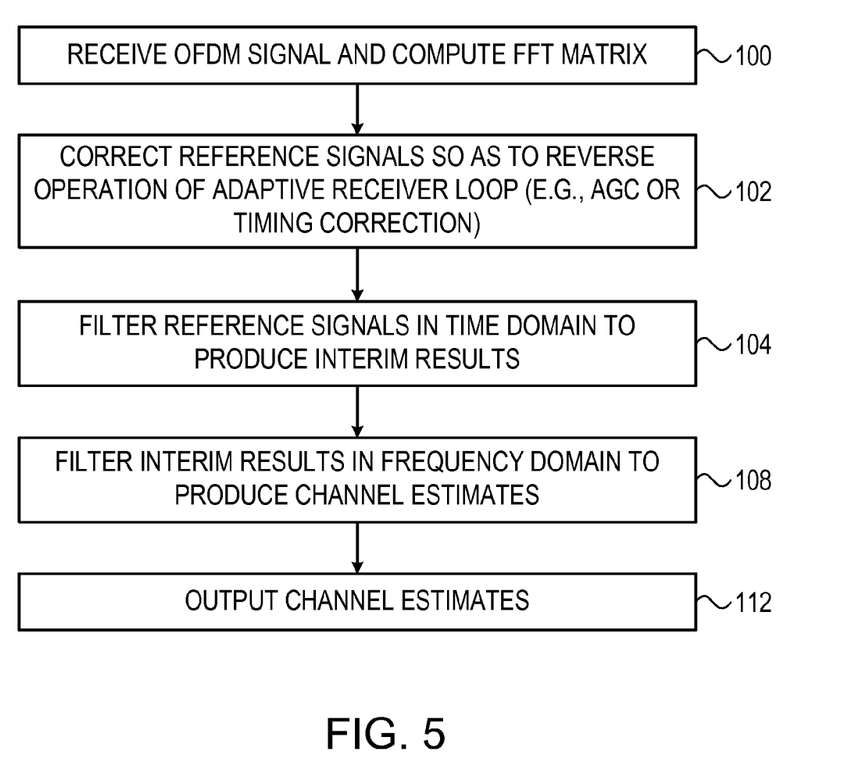
FIG. 5 is a flow chart that schematically illustrates a method for channel estimation in an OFDM receiver, in accordance with an embodiment that is described herein.

FIG. 5 is a flow chart that schematically illustrates a method for channel estimation in an OFDM receiver, in accordance with an embodiment that is described herein. The method begins at a reception operation 100, in which RX FE 36 of UE 28 receives an OFDM signal from BS 24, and demodulator 40 computes the FFT matrix for the received signal. At a reverse-correction operation 102, channel estimation unit 44 in UE 28 corrects reference signals in the received signal, in order to reverse the operation of an adaptive receiver loop (e.g., AGC or timing recovery loop). This correction is addressed in greater detail below.

At a time-filtering operation 104, filtering module 48 in channels estimation unit 44 applies time-domain filtering to the reference signals, to produce interim filtering results. At a frequency-filtering operation 108, filtering module 48 applies frequency-domain filtering to the interim filtering results, to produce channel estimates for the data REs. The channel estimates are provided as output, at an output operation 112.

In some embodiments, RX FE 36 or OFDM demodulator 40 apply a certain adaptive receiver loop to the received signal. Such an adaptive loop may comprise, for example, an Automatic Gain Control (AGC) loop, a timing correction loop or any other suitable loop. Typically, the adaptive receiver loop corrects the received OFDM symbols and thus affects the elements of the FFT matrix. As a result, the channel estimation process described above may be distorted.

In some embodiments, channel estimation unit 44 reverses the operation of the receiver loop when calculating the interim filtering results. In an example embodiment, unit 44 corrects the values of the reference signals so as to reverse the loop operation, before filtering the reference signals to produce the interim filtering results. Since the number of interim results is small when using the disclosed techniques, the number of corrections that are needed for reversing the loop operation is also small.

Although the embodiments described herein mainly address LTE systems, the methods and systems described herein can be used in any other system that transmits two-dimensional digital signals in which reference signals are distributed.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
   receiving signals that are transmitted over a communication channel in multiple blocks that are transmitted in respective frequency bins during respective time intervals, some of the blocks in a predefined subset of the frequency bins containing reference signals; and
   computing an estimate of the communication channel for a given block transmitted during a respective time interval by:
      defining a time-domain filter having first and second parts;
      computing respective interim filtering results for the blocks transmitted in the respective time interval in the respective frequency bins belonging to the predefined subset, by filtering one or more of the reference signals transmitted in the respective frequency bins of the block, such that a first subset of the reference signals is filtered using the first part of the time-domain filter and a second subset of the reference signals is filtered using the second part of the time-domain filter; and
      combining the interim filtering results, produced using the first and second parts of the time-domain filter, to produce the estimate of the communication channel for the given block.

2. The method according to claim 1, wherein computing the interim filtering results comprises initially filtering the reference signals in a time domain, and wherein combining the interim filtering results comprises subsequently filtering the interim filtering results in a frequency domain.

3. The method according to claim 2, wherein filtering the interim filtering results in the frequency domain comprises defining a frequency-domain filter having first and second parts, filtering a first subset of the interim filtering results using the first part, and filtering a second subset of the interim filtering results using the second part.

4. The method according to claim 1, wherein receiving the signals comprises receiving a sequence of Orthogonal Frequency Division Multiplexing (OFDM) symbols, wherein each frequency bin corresponds to a respective group of one or more OFDM subcarriers.

5. The method according to claim 1, wherein receiving the signals comprises correcting the received signals, including the reference signals, using an adaptive receiver loop, and wherein computing each interim filtering result comprises reversing a correction that was applied by the adaptive receiver loop to the reference signals transmitted in the respective frequency bins so as to generate reverse-corrected reference signals, and computing the interim filtering result using the reverse-corrected reference signals.

6. The method according to claim 5, wherein reversing the corrections comprises reversing gain or timing corrections that are applied to the received signals.

7. Apparatus, comprising:
a receiver, which is configured to receive signals that are transmitted over a communication channel in multiple blocks that are transmitted in respective frequency bins during respective time intervals, some of the blocks in a predefined subset of the frequency bins containing reference signals; and
a channel estimation unit, which is configured to compute an estimate of the communication channel for a given block transmitted during a respective time interval by:
defining a time-domain filter having first and second parts;
computing respective interim filtering results for the blocks transmitted in the respective time interval in the respective frequency bins belonging to the predefined subset, by filtering one or more of the reference signals transmitted in the respective frequency bins of the block, such that a first subset of the reference signals is filtered using the first part of the time-domain filter and a second subset of the reference signals is filtered using the second part of the time-domain filter; and
combining the interim filtering results, produced using the first and second parts of the time-domain filter, to produce the estimate of the communication channel for the given block.

8. The apparatus according to claim 7, wherein the channel estimation unit is configured to compute the interim filtering results by initially filtering the reference signals in a time domain, and to combine the interim filtering results by subsequently filtering the interim filtering results in a frequency domain.

9. The apparatus according to claim 8, wherein the channel estimation unit comprises a frequency-domain filter, which has first and second parts and is configured to filter a first subset of the interim filtering results in the frequency domain using the first part, and to filter a second subset of the interim filtering results in the frequency domain using the second part.

10. The apparatus according to claim 7, wherein the receiver is configured to receive a sequence of Orthogonal Frequency Division Multiplexing (OFDM) symbols, wherein each frequency bin corresponds to a respective group of one or more OFDM subcarriers.

11. The apparatus according to claim 7, wherein the receiver is configured to correct the received signals, including the reference signals, using an adaptive receiver loop, and wherein the channel estimation unit is configured to reverse a correction that was applied by the adaptive receiver loop to the reference signals transmitted in the respective frequency bins so as to generate reverse-corrected reference signals, and to compute the interim filtering result using the reverse-corrected reference signals.

12. The apparatus according to claim 11, wherein the channel estimation unit is configured to reverse gain or timing corrections that are applied to the received signals.

13. A mobile communication terminal comprising the apparatus of claim 7.

14. A communication base station comprising the apparatus of claim 7.

15. A chipset for processing signals in a mobile communication terminal, comprising the apparatus of claim 7.

16. A method, comprising:
receiving signals that are transmitted over a communication channel in multiple time-frequency blocks, some of the blocks containing reference signals; and
computing an estimate of the communication channel by defining a time-domain filter having first and second parts, applying to the reference signals a cascaded filtering scheme that initially carries out time-domain filtering, in which a first subset of the reference signals is filtered using the first part of the time-domain filter and a second subset of the reference signals is filtered using the second part of the time-domain filter, and subsequently carries out frequency-domain filtering.

17. The method according to claim 16, wherein computing the estimate of the communication channel comprises producing, using the time-domain filtering, fewer interim filtering results relative to an alternative cascaded filtering scheme that initially carries out the frequency-domain filtering and subsequently carries out the time-domain filtering.

* * * * *